(12) United States Patent
Gentric (10) Patent No.: US 11,829,345 B2
(45) Date of Patent: Nov. 28, 2023

(54) DISTRIBUTED DATA PROCESSING

(71) Applicant: Amadeus S.A.S., Biot (FR)

(72) Inventor: Philippe François Georges Gentric, La-Colle-sur-Loup (FR)

(73) Assignee: Amadeus S.A.S., Biot (FR)

( * ) Notice: Subject to any disclaimer, the term of this patent is extended or adjusted under 35 U.S.C. 154(b) by 198 days.

(21) Appl. No.: 17/430,871

(22) PCT Filed: Mar. 4, 2020

(86) PCT No.: PCT/EP2020/055697
§ 371 (c)(1),
(2) Date: Aug. 13, 2021

(87) PCT Pub. No.: WO2020/178340
PCT Pub. Date: Sep. 10, 2020

(65) Prior Publication Data
US 2022/0035790 A1    Feb. 3, 2022

(30) Foreign Application Priority Data

Mar. 4, 2019   (FR) ........................................ 1902193

(51) Int. Cl.
*G06F 16/00* (2019.01)
*G06F 16/23* (2019.01)
(Continued)

(52) U.S. Cl.
CPC .......... *G06F 16/2365* (2019.01); *G06F 17/18* (2013.01); *G06F 16/24552* (2019.01)

(58) Field of Classification Search
CPC . G06F 16/2365; G06F 17/18; G06F 16/24552
See application file for complete search history.

(56) References Cited

U.S. PATENT DOCUMENTS

| 7,490,237 | B1 * | 2/2009 | Morais | .................... | H04L 63/08 |
|           |      |        |        |                      | 713/181 |
| 7,509,372 | B2   | 3/2009 | Dutta et al. | | |

(Continued)

FOREIGN PATENT DOCUMENTS

EP        2885725 B1     6/2015

OTHER PUBLICATIONS

Vancea A., Stiller B. (2009) Answering Queries Using Cooperative Semantic Caching. In: Sadre R., Pras A. (eds) Scalability of Networks and Services. AIMS 2009. Lecture Notes in Computer Science, vol. 5637. Springer, Berlin, Heidelberg. https://doi.org/10.1007/978-3-642-02627-0_22.

(Continued)

*Primary Examiner* — Noosha Arjomandi
(74) *Attorney, Agent, or Firm* — Thompson Hine LLP (57) ABSTRACT

Data is handled in a distributed computing environment comprising at least one server and a plurality of clients comprising at least a first client and a second client. The first client sends a first request for data to the second client, receives a first response from the second client as a response to the first quest, determines a probability of validity of the data requested based on a validity indication included in the first response indicating a probability that the data requested from the second client is invalid. The first client determines that the data requested by the first request and available from the second client is likely invalid, sends a second request to the server to obtain the data from the server and receives the data from the server.

15 Claims, 10 Drawing Sheets

(51) Int. Cl.
 *G06F 17/18* (2006.01)
 *G06F 16/2455* (2019.01)

(56) References Cited

U.S. PATENT DOCUMENTS

| | | | |
|---|---|---|---|
| 8,145,845 B2 | 3/2012 | Rowley | |
| 9,448,932 B2* | 9/2016 | Jenkins | G06F 16/9574 |
| 9,774,661 B1* | 9/2017 | Besson | G06F 9/54 |
| 11,514,079 B1* | 11/2022 | Gouws | G06F 21/44 |
| 2002/0066026 A1* | 5/2002 | Yau | H04L 67/60 |
| | | | 709/200 |
| 2002/0120710 A1 | 8/2002 | Chintalapati et al. | |
| 2003/0061272 A1 | 3/2003 | Krishnamurthy et al. | |
| 2020/0084046 A1* | 3/2020 | Bessonov | H04L 9/321 |
| 2021/0157790 A1* | 5/2021 | Zamani | H04L 9/50 |
| 2022/0021521 A1* | 1/2022 | Shamai | H04L 9/0869 |
| 2022/0035790 A1* | 2/2022 | Gentric | G06F 17/18 |

OTHER PUBLICATIONS

Alexandros Labrinidis et al., "Caching and Materialization for Web Databases", Foundations and Trends in Databases, vol. 2, No. 3, Jan. 1, 2010, pp. 169-266.

Jianping Pan et al., "Retrieval and freshness thresholds in hierarchical caching systems", Computer Networks, vol. 44, Issue 2, Feb. 5, 2004, pp. 235-246, ISSN 1389-1286, https://doi.org/10.1016/j.comnet.2003.08.001.

European Patent Office, International Search Report and Written Opinion dated May 8, 2020 in International Application No. PCT/EP2020/055697.

* cited by examiner

DISTRIBUTED DATA PROCESSING

The present invention relates to data handling in a distributed computer environment comprising at least one server and a plurality of clients comprising at least a first client and a second client. More specifically, it relates to propagating data among clients such as clients of a peer-to-peer network.

The increasing range of web technologies and distributed computing systems over the last decades has led to the need to distribute data which is only valid for a limited time. Therefore, a further optimization of data distribution over a network is to be expected in order to ensure that servers and clients receive and send mostly only valid data, e.g data which are not outdated, thereby eliminating the transmission and processing of invalid data and as its consequence reducing web traffic load and the workload on servers and clients. Over the last years, some approaches have been undertaken in this regard.

U.S. Pat. No. 7,509,372 B2 describes a peer-to-peer system, wherein a first (client) peer node sends a request for content to a second peer node, which has stored the requested content. Based on an overload condition of the second (server) peer node, the second (server) peer node either returns the requested content to the first peer node or returns a list with alternate peer nodes, from which the requested content can be retrieved. The first (client) peer node may then retrieve the requested content from one of the alternate peer nodes.

U.S. Pat. No. 8,145,845 B2 relates to retrieving data from a Light-weight Directory Access Protocol (LDAP) which can be applied to a peer-to-peer system. If the requested data is present, valid and a time-to-live (TTL) for the LDAP attribute or the LDAP index has not expired, the data may be retrieved from a virtual attribute cache and returned to the requesting client, application server or LDAP operation. A TTL indicator is used to allow the determination of whether an associated data item in a cache, index, virtual cache, virtual index or similar data structure is accurate or reliable. If the virtual attribute is indexed, but the TTL of the index has expired or otherwise been invalidated, then a signal may be sent to initiate the rebuilding of the index.

US 2002/0120710 A1 describes a client sending a request for a set of dynamic content to a server. The server then accesses information associated with a cached version of the content and determines whether the content is still valid. If the content is not valid, an updated version of the content is derived and sent to the client.

US 2003/0061272 A1 relates to a proxy cache residing in a network environment and receiving a request for a particular resource. If the proxy cache determines that the document does not reside in the cache or that the document may not be valid, the proxy cache then constructs a request to a server which is the source for the document and asks for a copy of the document or whether the cached version is valid.

According to a first aspect, a method for handling data in a distributed computing environment comprising at least one server and a plurality of clients comprising at least a first client and a second client is provided. The method comprises sending, at the first client, a first request for data to the second client, receiving a first response from the second client as a response to the first quest, determining a probability of validity of the data requested by the first request and available from the second client based on a validity indication included in the first response indicating a probability that the data requested from the second client is invalid and in response to determining that the data requested by the first request and available from the second client is likely invalid, sending a second request to the server to obtain the data from the server and receiving the data from the server in a second response to the second request.

According to a further aspect, the second response includes a validity indication indicating a probability that the data requested from the server is invalid. The data received from the server associated with the validity indication included in the second response are stored.

According to a still further aspect, the determining of the probability of validity of the data requested by the first request and available from the second client comprises estimating a time of receipt of the data from the second client based on a size of the requested data included in the first response and a given bandwidth of a connection to the second client. The probability of validity of the data is determined at the estimated time of receipt.

In accordance with a still further aspect, the method comprises in response to determining that the data requested by the first request and available from the second client is likely valid retrieving the data from the second client if the data was not already included in the first response and storing the retrieved data associated with the validity indication included in the first response.

According to further aspects, the first client receives a third request for the data from a third client and sends a third response to the third client in response to the third request, wherein the third response comprises the validity indication associated with the data.

According to a still further aspect, the first client evaluates, in response to receiving the third request, the probability that the requested data is invalid based on the stored validity indication associated with the data, and includes, in response to determining that the requested data is likely still valid, in the third response the data requested by the third client.

According to another aspect, the validity indication comprises a timestamp t0 indicating a time when the requested data was generated.

According to another aspect, the validity indication further comprises a validity rate C of the requested data modeled by a probabilistic model.

In accordance with a still further aspect, the determining that the requested data is potentially invalid comprises calculating a validity probability value given by $$e^{-C(t-t0)} \qquad \text{(equation 1)}$$

wherein t denotes a current time or the estimated time of receipt of the data and comparing the validity probability value with a given threshold value and determining that the requested data is likely invalid if the validity probability value is below the given threshold value.

According to another aspect, a computing machine is provided, the computing machine acting as a first client for handling data in a distributed computing environment comprising at least one server and a plurality of clients comprising at least the first client and a second client, the computing machine being arranged to execute the method of any one of the aforementioned aspects.

According to another aspect, a computer program product is provided, the computer program product comprising program code instructions stored on a computer readable medium to execute the method steps according to any one of the aforementioned aspects when said program is executed on a computer.

The present mechanisms will be described with reference to accompanying figures. Similar reference numbers generally indicate identical or functionally similar elements.

The increasing field of applications for web technologies and distributed computing systems has led to the problem to effectively transmit data possessing time-limited validities over peer-to-peer systems. In particular, it should be ensured that data-requesting clients being part of a distributed environment receive valid data, in order to avoid data inconsistency within the distributed environment.

For example, data invalidity might occur in data selected and copied from underlying data stored in a database when the database content undergoes changes, e.g. by alteration of the underlying data through data updates. Data copied from a selected set of underlying data may then be no longer identical to the corresponding updated set of underlying data, after the data update in the database has been performed. As a consequence, the copied data becomes outdated and therefore invalid, and further distribution over networks and processing by clients leads to inconsistency of the data within the client of the distributed environment.

Examples of data becoming invalid after a certain lifetime are plans for electronic circuits for computing equipment such as mobile phones, which may change when a new version of the mobile phone is released, and technical standards, such as 3GPP specifications, which are revised over time and thus exist in multiple releases and versions.

Figure 1:
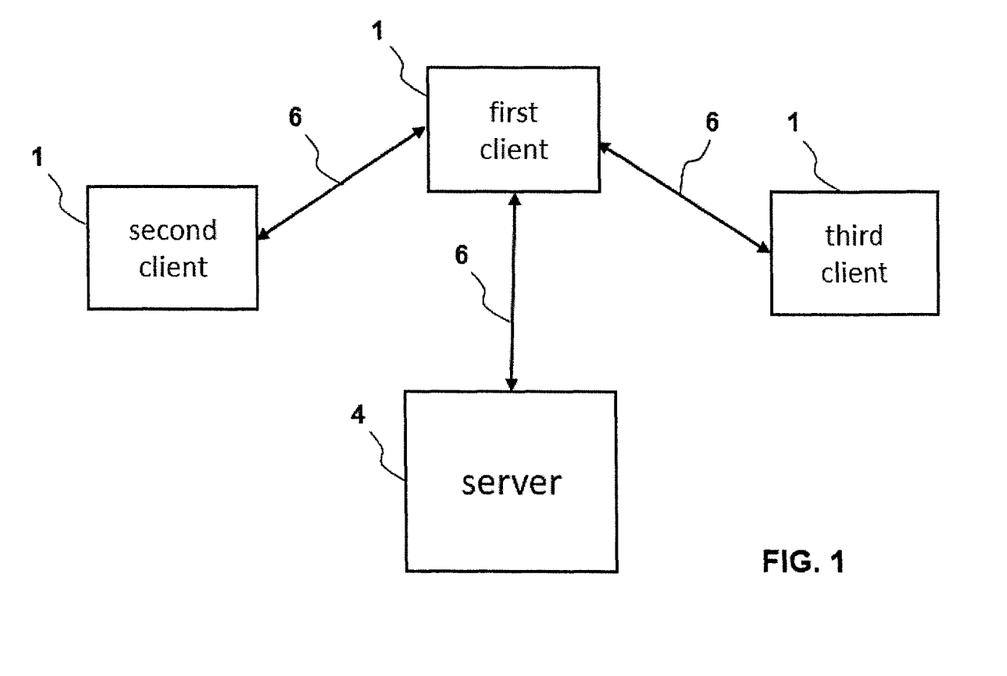
FIG. 1 is schematic depiction of a distributed computer environment according as described herein.

FIG. 1 illustrates a distributed computing system such as a peer-to-peer network as utilized herein in a schematic manner. The computing system includes a number of clients 1, a server 4 and a number of communication interfaces 6. In some embodiments, the server 4 and the clients 1 are individual computing machines such as personal computers, mobile stations such as laptops or tablet computers, smartphones, and the like, as well, in some embodiments, more powerful machines such as database application servers, distributed database systems respectively comprising multiple interconnected machines, data centers, etc. In some embodiments, the server 4 might be a similar machine as the clients 1, while, in other embodiments, the server 4 is more powerful than the clients 1. In one embodiment, the server 4 and the clients 1 are data centers, wherein the clients 1 replicate data hold by the server data center and make available the data e.g. in further geographical parts of the world (e.g. other continents) beyond the geographical location of the server data center.

Figure 11:
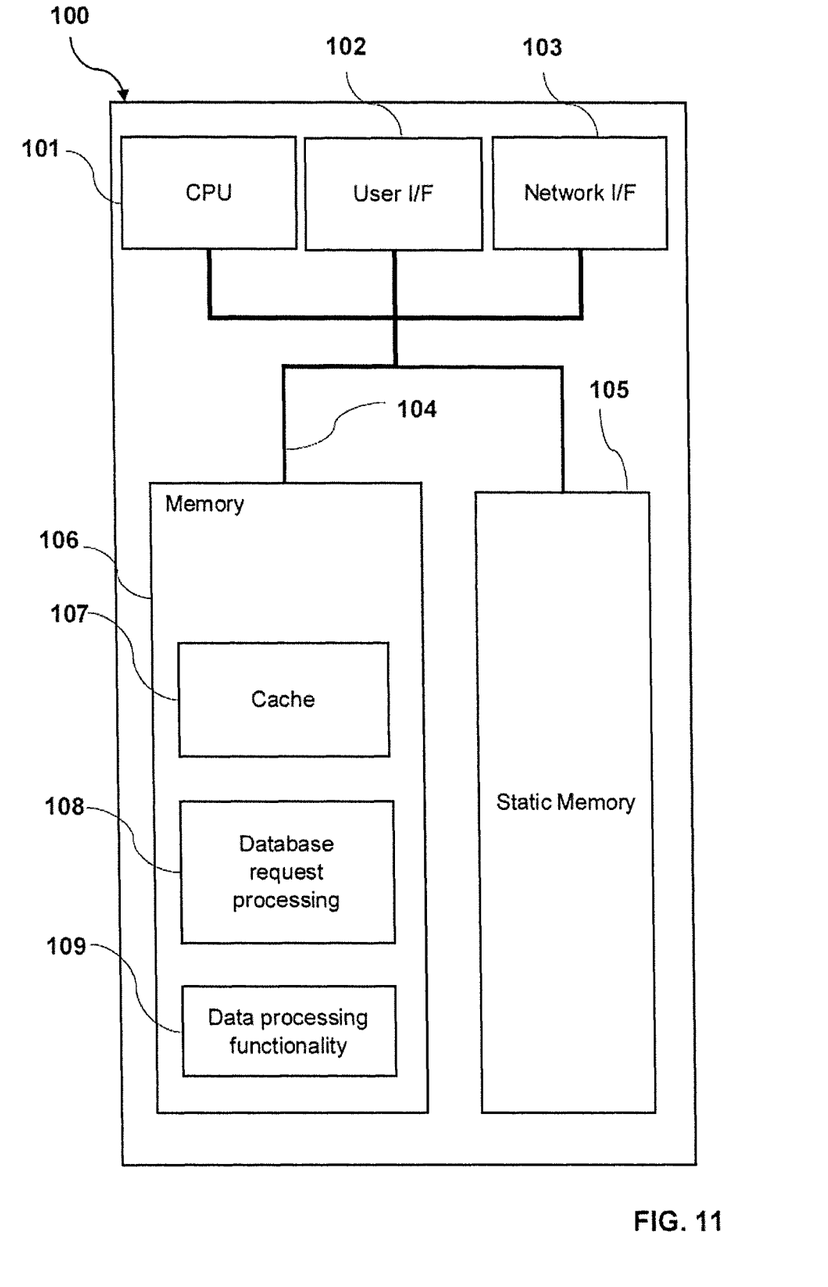
FIG. 11 is a diagrammatic representation of the internal components of a computing machine according to some embodiments.

The server 4 and the clients 1 may be constituted of several hardware machines depending on performance requirements. Both, server 4 and clients 1, are embodied e.g. as stationary or mobile hardware machines comprising computing machines 100 as illustrated in FIG. 11 and/or as specialized systems such as embedded systems arranged for a particular technical purpose, and/or as software components running on a general or specialized computing hardware machine (such as a web server and web clients).

The server 4 and the clients 1 are interconnected by the communication interfaces 6. Each of the interfaces 6 utilizes a wired or wireless Local Area Network (LAN) or a wireline or wireless Metropolitan Area Network (MAN) or a wireline or wireless Wide Area Network (WAN) such as the Internet or a combination of the aforementioned network technologies and are implemented by any suitable communication and network protocols.

In an exemplary distribution scenario of data potentially becoming invalid after a certain lifetime, the server 4 holds a relational SQL (Structured Query Language) database and receives a SQL query from a first client 1 (which is further denoted as client 1A, see FIG. 2 et seq.) to retrieve some data from the SQL database, such as a view "tableAB" based on two database tables, "tableA" and "tableB", containing underlying data. After receiving the request from the first client 1A, the server 4 identifies the relevant database tables of the SQL database. Subsequently, the server 4 receives the identified database tables and stores the database tables e.g. in the main storage system of the server 4.

The server 4 continues with the processing of the retrieved database tables and creates subsets of database tables from the database tables using the SQL command CREATE VIEW. The subsets of database tables form again database tables and are commonly known as views and serve as a basis for the creation of new database tables using SQL statements such as JOIN, LEFT OUTER JOIN, RIGHT OUTER JOIN etc. Subsequently, using a SQL statement such as SELECT, the server 4 creates the data requested by client 1A. In addition, the data may be sorted according to criteria as identified in the request from client 1A.

To further specify the example, database table "tableA" may reside on a first SQL database and database table "tableB" may reside on a second SQL database. Server 4 receives "tableA" and "tableB" and stores them in the main storage system or the cache of server 4. After uncoding, elimination of errors and the definition of a common format as described in the aforementioned examples, the server 4 continues with the processing using the following SQL statements:

CREATE VIEW viewA (data1A, data2A) AS
SELECT data1A, data2A FROM tableA;
CREATE VIEW viewB (data1B, data2B) AS
SELECT data1B, data2B FROM tableB;
CREATE VIEW tableAB AS
SELECT data1C, data2C, data2A, data3C, data2B
from tableC, viewA, viewB
where tableC.data1C=viewA.data1A
and tableC.data2C=viewB.data1B Finally, the data stored in view "tableAB" is sent, possibly after some postprocessing such as compression, to the first client 1A which has requested the data.

At a later time, the first client 1A receives a request for view "tableAB" from a second client 1 (which is further denoted as client 1B, see FIG. 2 et seq.) and sends "tableAB" to the second client 1B. At still a later time, the second client 1B may also itself receive a further request from a third client 1 (which is further denoted as client 1C, see FIG. 9) and sends the view "tableAB" to third client 1C. Further cascades of this process distribute the view "tableAB" over the network.

While the view "tableAB" gets distributed over the network, the underlying data originally stored in the database tables "tableA" and/or "tableB" are replaced by new underlying data, i.e. the data underlying the view "tableAB" are updated. The same SQL query by the first client 1A would now yield a different view "tableAB_UPDATED" being built on the updated/different data. Hence, the view "tableAB" has become outdated.

However, in the case that client 1A does not resend the aforementioned SQL query, other clients will not receive the view "tableAB_UPDATED" built on the updated valid data. Instead, the view "tableAB" with the invalid data continues to be distributed to other clients of the network.

In addition, the update of the data underlying the view might introduce data inconsistency. For example, when the first client 1A does indeed resend the aforementioned SQL query and subsequently receives view "tableAB_UPDATED", the first client 1A holds the updated version of the view. Hence, any requests from other clients to first client 1A for the view "tableAB" would now be responded to with "tableAB_UPDATED" which propagates through the network. However, other clients such as the second client 1B and the third client 1C still maintain the old, outdated version view "tableAB" and would thus continue to distribute this outdated version in response to requests. Hence, this results in a parallel distribution the updated view "tableAB_UPDATED" having been built on valid data as well as of the outdated view "tableAB" having been built on invalidated data. If the clients form, for example, a distributed database, inconsistent versions of the same data may occur in this database.

It is therefore an object to provide mechanisms ensuring that a client residing in a network such as a peer-to-peer network or a distributed database and requesting data from another client are provided with valid data in an efficient manner. It is also an object to refrain from putting additional load onto servers while improving data consistency in the distributed environment.

Generally, these objects are addressed by associating validity information with data held by clients and enabling the data requesting clients to determine whether data requested from and held by other clients are likely still valid. More specifically, a validity indication associated with the data is provided to the data requesting client. As an example, the validity indication may comprise a calculated or calculable validity probability value (further detailed below). Requested data are then considered to be invalid by a requesting client in response to determining that the validity probability value associated with the requested data falls below a given threshold value. The calculation of the validity probability value may include, as an example, calculating the current age of the requested data, based on a generation date and a current time.

Figure 2:
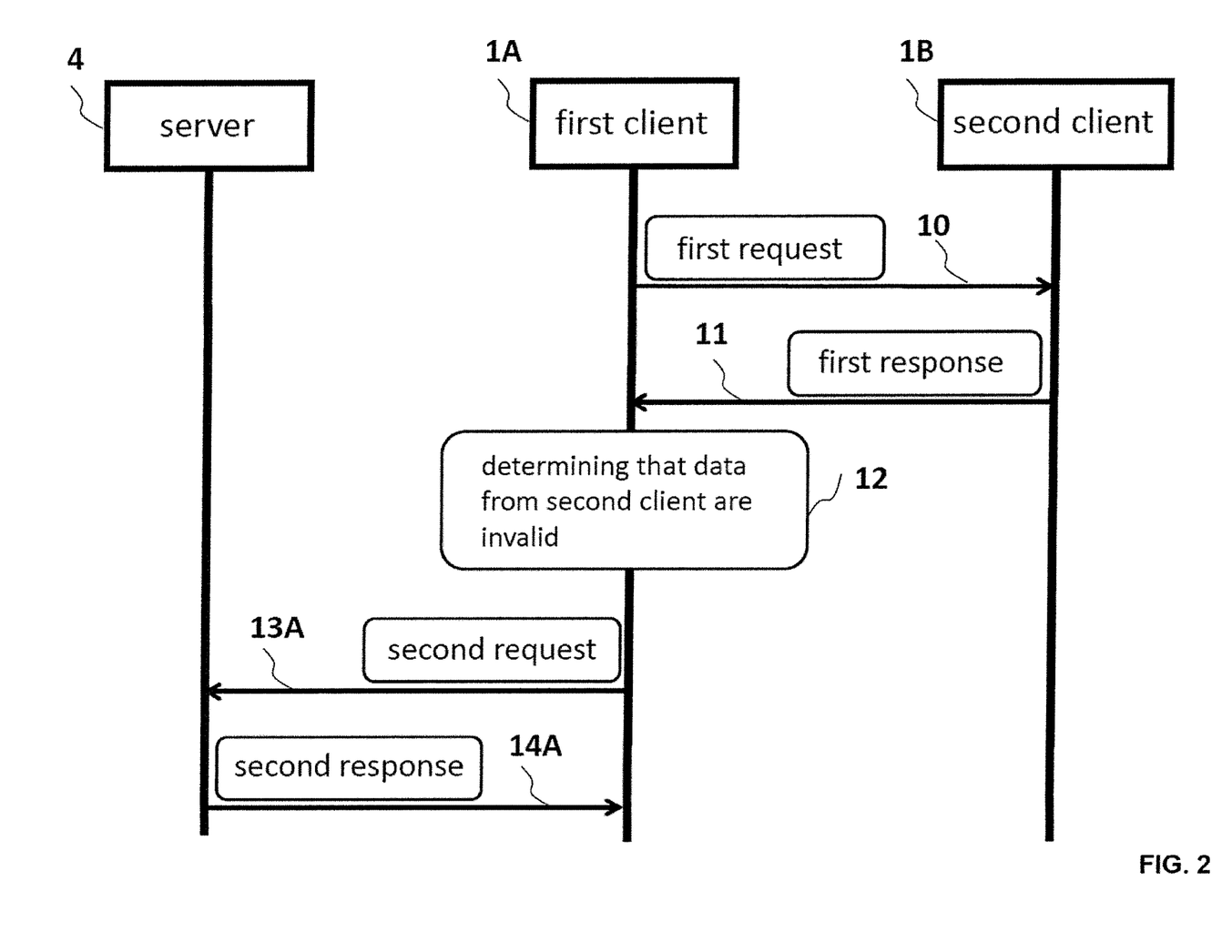
FIG. 2 is a message sequence diagram according to some embodiments.

A message sequence chart for a general mechanism according to some embodiments is presented in FIG. 2. A first client 1A sends a first request 10 for data (e.g. view "tableAB" as introduced above) to a second client 1B and receives a first response 11 from the second client 1B as a response to the first request 10. The first response 11 includes a validity indication indicating a probability that the data requested by the first client 1A from the second client 1B is invalid. Subsequently, the first client 1A then determines 12 a validity probability of the data requested by the first request 10 and available from the second client 1B based on the validity indication included in the first response 11. If the determination 12 yields that the data requested by the first request 11 and available from the second client 1B is likely invalid, the first client 1A sends a second request 13A to the server 4 to obtain the data from the server 4, as the server 4 presumably holds a currently valid version of the requested data. In response to the second request 13A, the first client 1A receives the data from the server 4 in a second response 14A.

Referring to the specific example above, the second client 1B may hold the outdated version view "tableAB". On the basis of the validity indication included in the first response 11, the first client 1A calculates a high likelihood that the view "tableAB" is not valid anymore. The first client 1A then turns to the server 4 by means of the second request 13A and receives the currently valid version view "tableAB_UPDATED" by way of the second response 14A.

This goes beyond the mere redirection of data requests in peer-to-peer networks e.g. described in U.S. Pat. No. 7,509,372 B2, where data requests from a first peer node (client) to a second peer node (server) are redirected to alternative peer nodes in the case the second node is in an overload condition. While U.S. Pat. No. 7,509,372 B2 teaches load management, the present mechanisms increases data consistency in a distributed environment by enabling clients to provide validity indications for requested data, a validity probability calculation at a data requesting client and referring to an original data source (e.g. server 4) in case the invalidity probability is high (i.e. above a given threshold).

In some embodiments, also the second response 14A includes a validity indication indicating a validity probability of the data requested and retrieved from the server 4. The first client 1A stores the data received from the server 4 associated with the validity indication included in the second response 14A. The data received from server 4 (e.g. view "tableAB_UPDATED") have a generation date, from which the age of the data can be calculated. Hence, the validity indication included in the second response 14A might indicate the generation date of the received data. This enables the first client 1A to provide the validity indication for the data retrieved from the server 4 to still other data requesting client (such as a third client 1C, see FIG. 9) in order to enable these other clients to determine the validity probability of the requested data. Referring again to the example above, the server 4 may include the generation date of the view "tableAB_UPDATED" in the second response 14A to the first client 1A. When a third client 1C sends a request to the first 1A for the view "tableAB_UPDATED", the first client 1A may respond with the generation date of the view "tableAB_UPDATED" first, in order to enable the third client 1C to assess the validity probability in order to decide whether to retrieve the view "tableAB_UPDATED" from the first client 1A or retrieve a potentially further updated version of the view "tableAB_UPDATED" from the server 4.

In some embodiments, the validity indication includes information on the size of the data requested from second client 1B, a time of generation of the requested data, optionally, a validity rate of the requested data as well as, further optionally, information of the version of the requested data stored at second client 1B.

Data size indications are particularly advantageous for large requested data, the transmission of which from the second client 1B to the first client 1A might consume such a time span in which the validity of the requested data might significantly decrease or cease. Therefore, in these embodiments, the first client 1A takes into account the indicated data size in order to calculate the validity probability at the estimated time of complete arrival of the requested data from the second client 1B. More specifically, the validity probability determination 12 comprises estimating a time of (complete) receipt of the data from the second client 1B based on the size of the requested data included in the first response 11 and a given bandwidth of a connection to the second client 1B. In addition, the first client 1B calculates the probability of validity of the data at the estimated time of receipt. For example, the first client 1A uses the time of creation to calculate the age of the requested data at the estimated time of receipt. Optionally, the validity rate and/or the information on the version of the data as included in the validity indication is included in the calculation of the validity probability at the estimated time of receipt. The validity probability is compared with a given threshold value (e.g. stored at the first client 1A) as already mentioned above.

This upfront determination 12 might take a considerably shorter time compared to the retrieval of the (possibly large) data itself and only then determining that the retrieved data are possibly outdated. If first client 1A determines 12, based on the results of the calculation, that the data requested from the second client 1B are potentially invalid at the estimated time of receipt, the first client 1A might proceed with sending the second request 13A to the server 4 and obtaining the data from the server 4.

In some embodiments, the second request 13A includes the same data as the first request, but will also include information on the validity of the data requested from second client 1B (e.g. view "tableAB"). In some embodiments, the second request 13A included the validity probability of the data requested from second client 1B (e.g. view "tableAB") as calculated by the first client 1A. In some embodiments, the version of the data stored on second client 1B (e.g. view "tableAB") is included in the second request 13A. In some embodiments and not shown in FIG. 2, server 4 uses this validity probability and/or the information on the version to examine whether server 4 has stored at itself the same version of the data requested from the second client 1B, e.g. stored at itself the view "tableAB" or an updated version of view "tableAB", which is in the case of the cited example, the view "tableAB_UPDATED". If server 4 has also stored the same version of the data requested from second client 1B (view "tableAB"), then server 4 may, in some embodiments, include in the second response 14A to first client 1A only the information, that no updated version and therefore no more valid version of the data requested from second client 1B is available and recommendation to first client 1A to request the data/e.g. view "tableAB") form the second client 1B. This method results in the creation of only a short third response 16 and therefore relieves additional workload from server 4.

Figure 3:
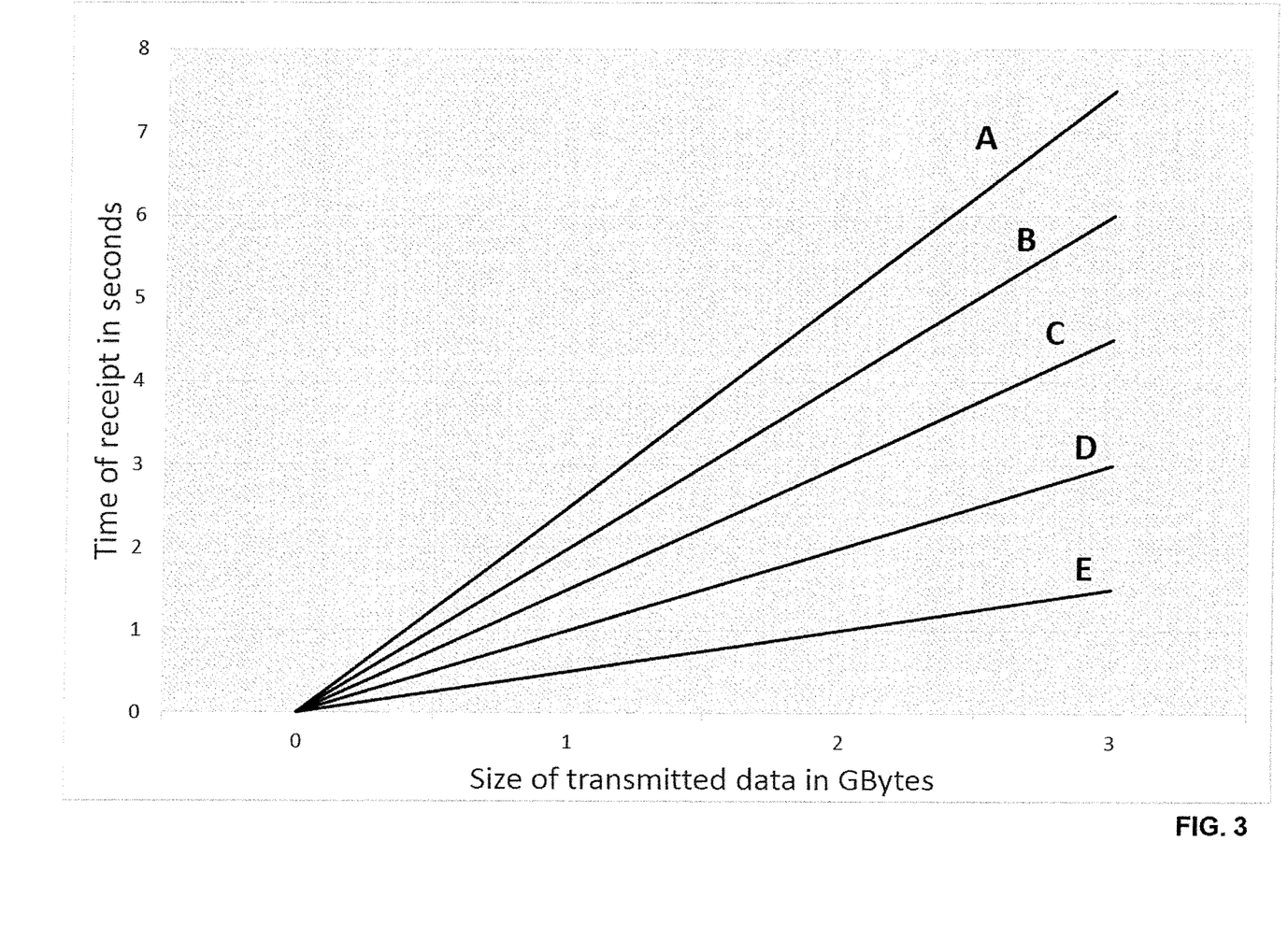
FIG. 3 shows the time of receipt in arbitrary units (e.g in seconds) as a function of the size of the transmitted data in arbitrary units (e.g. in seconds) according to some embodiments.

FIG. 3 visualizes various times of receipt in steps of 2000 s as a function of the size of the transmitted data in GB (Gigabytes) for identically sized data. The more bandwidth a connection between two clients, e.g. between first client 1A and second client 1B, has at its disposal, the earlier the first client 1A receives the requested data (e.g. view "tableAB"). If, as an example, it is assumed that view "tableAB" requested by first client 1A has a size of 1 GB, then a bandwidth of 0.5 MByte/s (Megabytes per second) enables first client 1A to receive view "tableAB" in 2000 s (or around 33 min, see curve D in FIG. 3). A higher bandwidth of e.g. 1 MB/s would enable the first client 1A to receive the view "tableAB" in 1000 seconds (or around 17 minutes, see curve E in FIG. 3), therefore resulting in a higher projected probability of validity for view "tableAB" at the estimated time of receipt. On the contrary, lower bandwidths such as e.g. 0.3 MB/s (curve C), 0.25 MB/s (curve B) and 0.2 MB/s (curve A) result in later times of receipt and therefore in a lower projected probability of validity for view "tableAB" at the estimated time of receipt.

The bandwidth information utilized by the first client 1A to determine the estimated time of receipt of the requested data may be included in the first response 11, may be obtained by connection measurements of the first client 1A (conducted before the first request 10, while waiting for the first response 11 and/or after the first response 11), or a default bandwidth value may be used.

Figure 4:
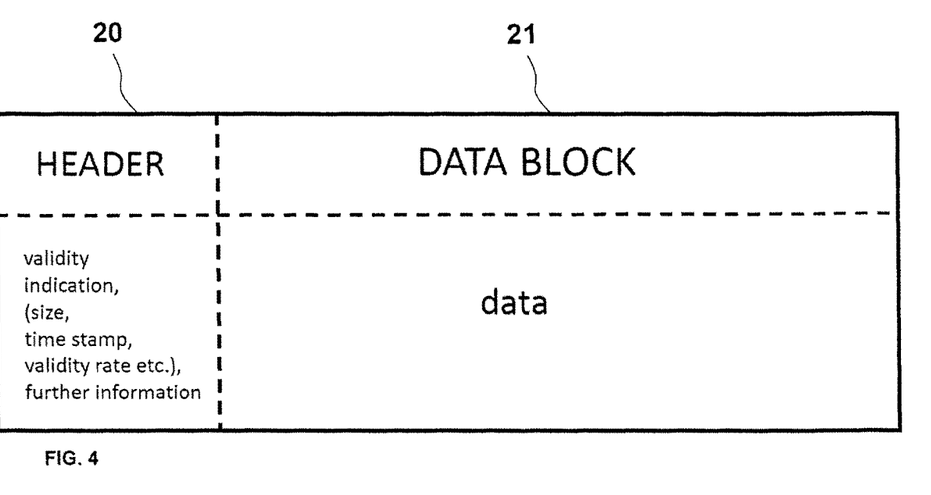
FIG. 4 shows a possible data format of first response according to some embodiments.
Figure 5:
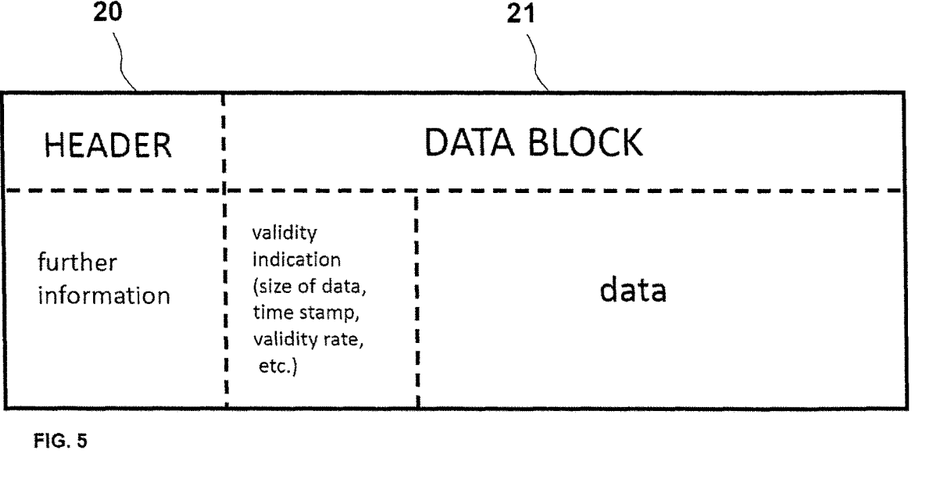
FIG. 5 shows a possible data format of first response according to some further embodiments.

FIGS. 4 and 5 show data format examples of the first response 11 and the second response 14A. The response 11, 14A may include a header section 20 and a data section 21. The header section 20 may additionally include, as part of the aforementioned validity indication, the size of the data, the timestamp indicating the creation of the data, the validity rate, the version of the data etc. (FIG. 4). Further information included in the header section 20 and not shown in any one of the figures may include information such as protocol information, sender and recipient addresses etc., depending on the OSI model protocol layer of the header. The first response 11 may also include the data requested with first request 10 (e.g. the view "tableAB"). The data requested in first request 10 may be included in a data block section 21 of the first response 11. The validity indication may, in some embodiments and/or depending on the OSI model protocol layer of the header 20, be included in the data section 21 of first response 11 (FIG. 5). For example, the validity indication may be included in the application layer (OSI layer 7) header of a peer-to-peer application protocol (FIG. 4), while—from the perspective of the network layer (OSI layer 3)—the header 20 is an Internet Protocol (IP) header and the validity indication is located in the data block 21 (FIG. 5).

The message sequence chart of FIG. 2 represents an embodiment of the invention where a validity indication is included in the first response 11. However, in some embodiments, not all first responses 11 necessarily include a validity indication. In such embodiments, the first client 1A determines whether or not a validity indication is included in the first response. In these embodiments, the second client 1B might directly respond with the requested data in the first response 11. Still, if such a validity indication is not included in the first response 11, first client 1A might decide based on further information whether the data requested by the first request 10 should (additionally) be requested from the server 4. For example, absence of a validity indication in the first response 11 might indicate that the data included in the first response 11 is likely valid. Thus, there is no need for the first client 1A to additionally retrieve the data from the server. In some embodiments, this decision is based, as an example, on the size of the data received from the second client 1B. If the data is relatively small, additionally retrieving the data from the server and comparing both versions of the data in order to determine which is the more current version does not impose a significant load on the network. If, however, the data is relatively large, an additional retrieval of the data from the server 4 might be spared and the first client 1A proceeds with the data received from the second client 1B.

Figure 6:
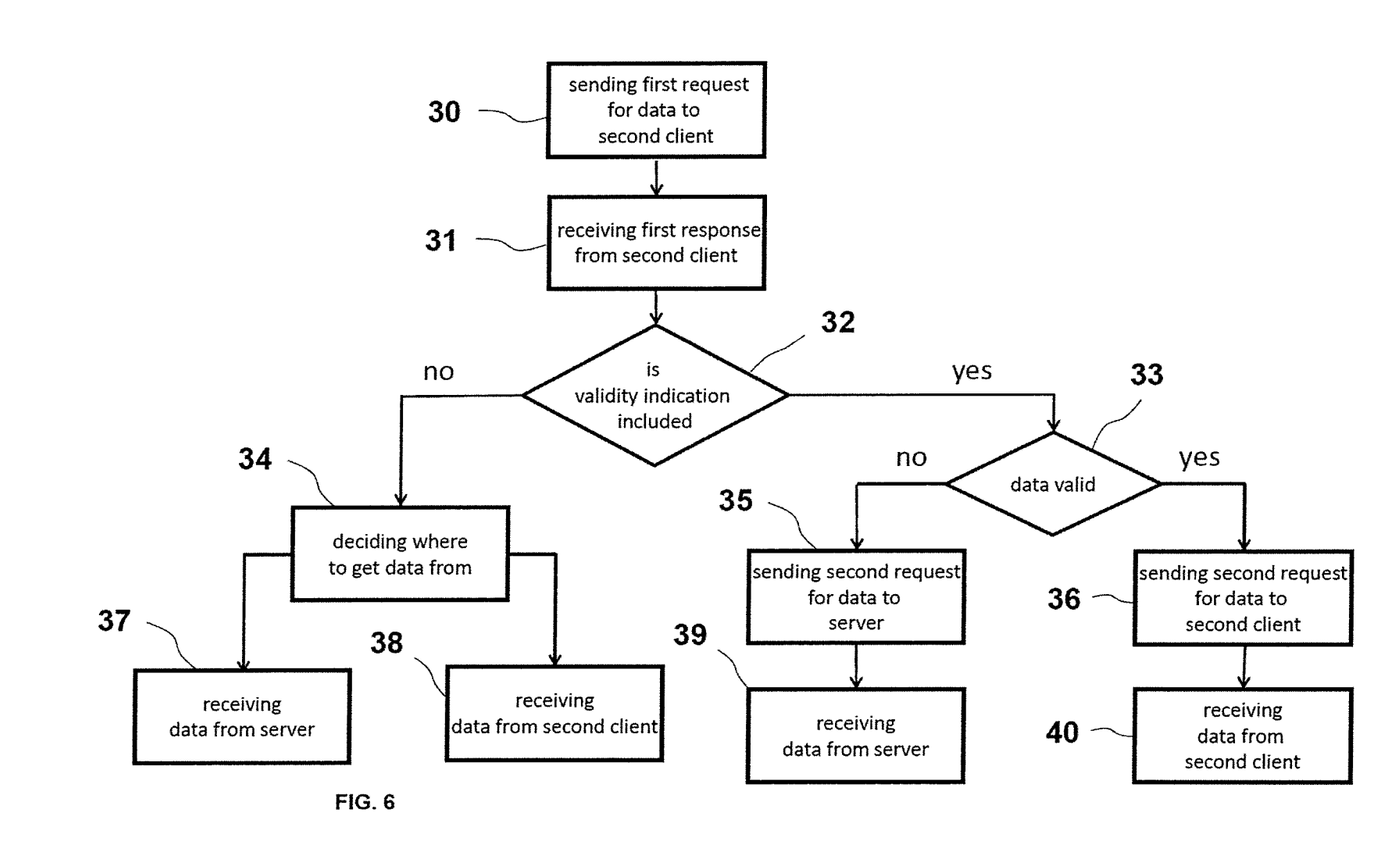
FIG. 6 shows in a flow diagram the possible scenarios available for the first client for receiving data according to some embodiments.

FIG. 6 shows a flow diagram of ways for the first client 1A for receiving the requested data when the validity indication in first response 11 is either present or absent. In 30, the first client 1A sends a first request 10 for data to the second client 1B (corresponding to FIG. 2). In 31, the first client 1A receives the first response 11. In 32, the first client 1A examines whether a validity indication is included in the first response 11. When it is determined that the validity indication is included, the flow of actions corresponds to FIG. 2 or FIG. 8 referred to below. That is, the first client 1A determines 12 whether the data requested by the first request 11 and available from the second client 1B is likely invalid. If the data available from the second client is determined to be likely invalid, the first client 1A sends, in 35, the second request 13A for data to the server 4 and finally receives, in 39, the requested data from the server 4 with the second response 14A. If, on the other hand, by determination 12, in 33, the data available from the second client (second client 1B) is determined to be likely valid, the first client 1A sends, in 36, a second request 13A for the data to the second client 1B and, in turn, receives 40 the requested data from the server 4 in the second response 14A. If, on the other hand, a validity indication is not included in the first response 11, as determined in 32, the first client 1A decides, in 34, based on the aforementioned further information whether to receive, in 38, the data from second client 1B (as mentioned above and described in more detail below with reference to FIG. 7, the data may have already been included in the first response 11, in which case activities 31 and 38 coincide; alternatively, the first response may only indicate that the requested data is available at the second client 1B, in which case a dedicated retrieval 38 is performed), and/or to receive, in 37, the data from the server 4.

Figure 7:
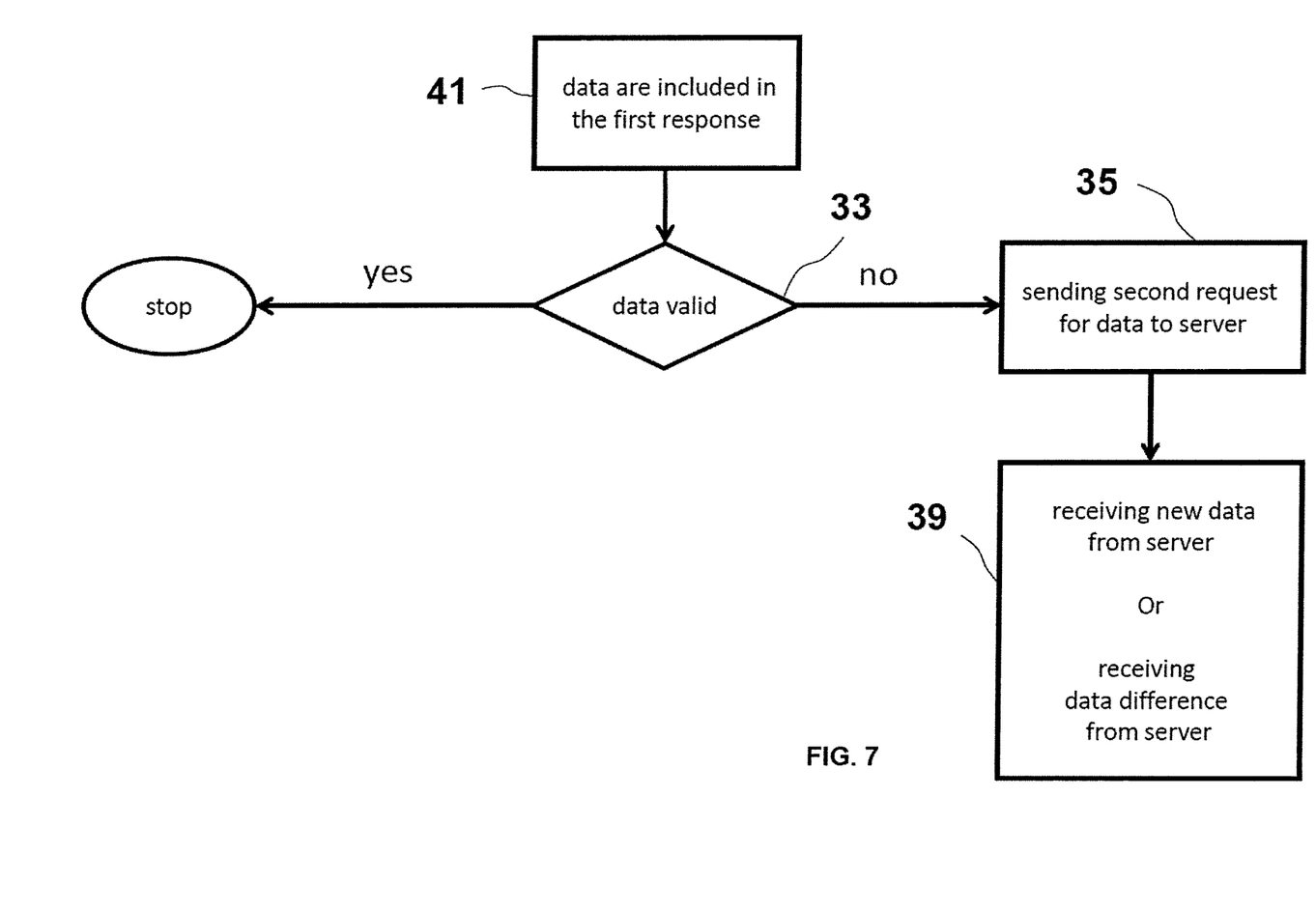
FIG. 7 shows a possible scenario when the requested data is included in the first response according to some embodiments.

FIG. 7 shows a scenario when the data (e.g. view "tableAB") is already included in the first response 11. The first client 1A recognizes, at 41, that the first response 11 already includes the requested data. When the determination 12 yields, at 33, that the data requested by the first request 11 and available from the second client 1B is likely valid, then the retrieval process concludes and the first client 1A processes the received version of the data. If the data included in the first response 11 is, however, determined 12, to be likely invalid, then first client 1A requests, at 35, the data from the server 4 by way of the second request 13A and proceeds according to FIG. 2 to receive, in 39, e.g. the current valid view "tableAB_UPDATED". In some embodiments, the first client 1A does not retrieve the requested data (e.g. the valid view "tableAB_UPDATED") as a whole, but only the differences between the potentially outdated data already received from the second client 1B and the possibly updated version of the data from the server 4. This additionally saves network and server computation resources load.

Figure 8:
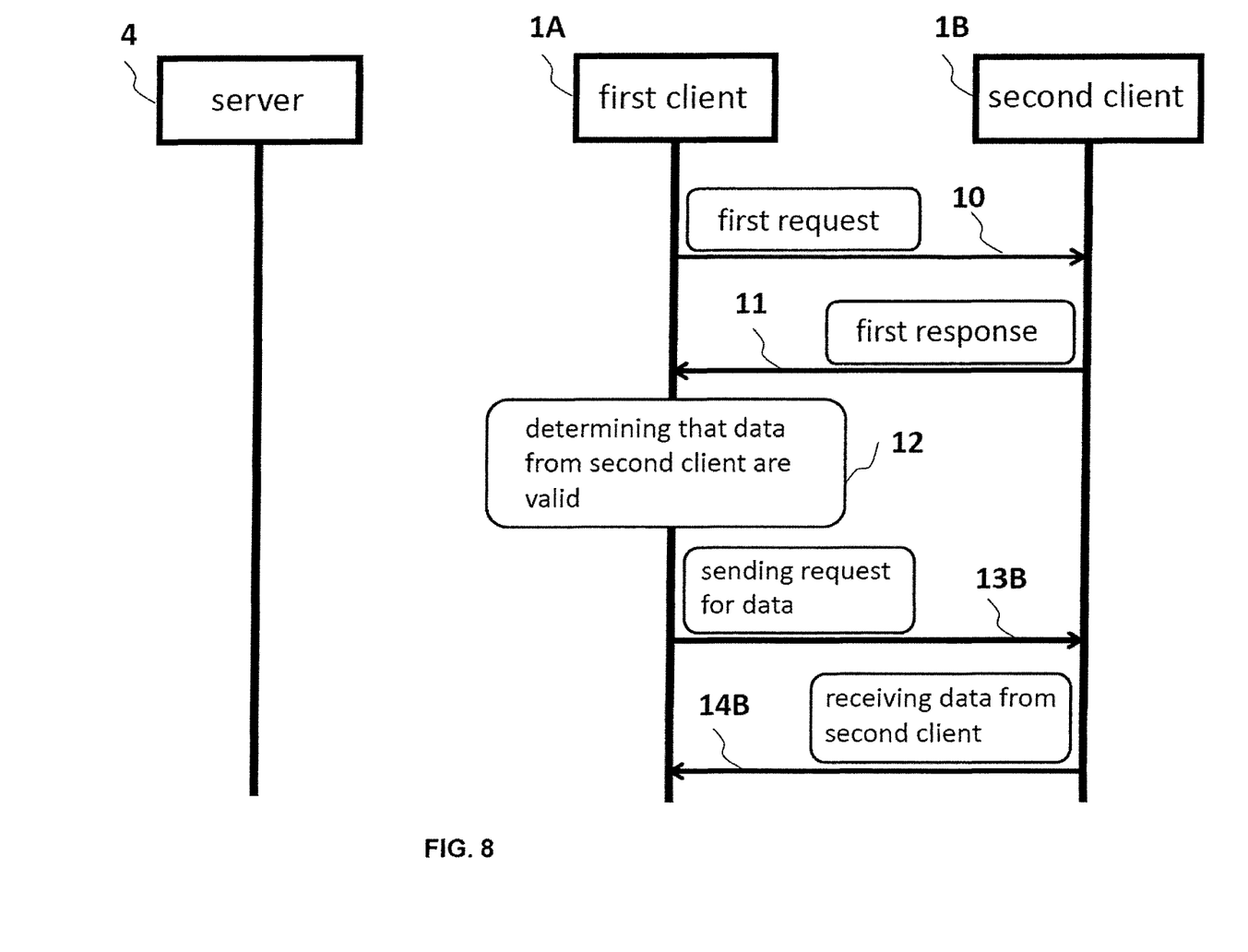
FIG. 8 is a message sequence diagram according to another embodiment.

Message sequence charts for a mechanism according to some embodiments are shown by FIG. 8. In the example of FIG. 8, the data available through the second client 1B is determined to be likely valid. As already described above with reference to FIG. 2, the first client 1A first sends the first request 10 for data (e.g. view "tableAB") to the second client 1B and receives a first response 11 from the second client 1B as a response to the first request 10. The first response 11 includes a validity indication indicating a probability that the data requested from the second client 1B is invalid. Subsequently, the first client 1A then determines 12 a probability of validity of the data requested by the first request and available from the second client based on the validity indication included the first response 11. If the determination 12 yields that the data requested by the first request 11 and available from the second client 1B is likely valid and if the data has not already been included in the first response 11, the first client 1A sends in response a second request 13B to the second client 1B to obtain the data (view "tableAB") from the second client 1B. Finally, in response to the second request 13B, the first client 1A receives the data from the second client 1B in a second response 14B and stores the retrieved data (view "tableAB") associated with the validity indication included in the first response 11.

Figure 9:
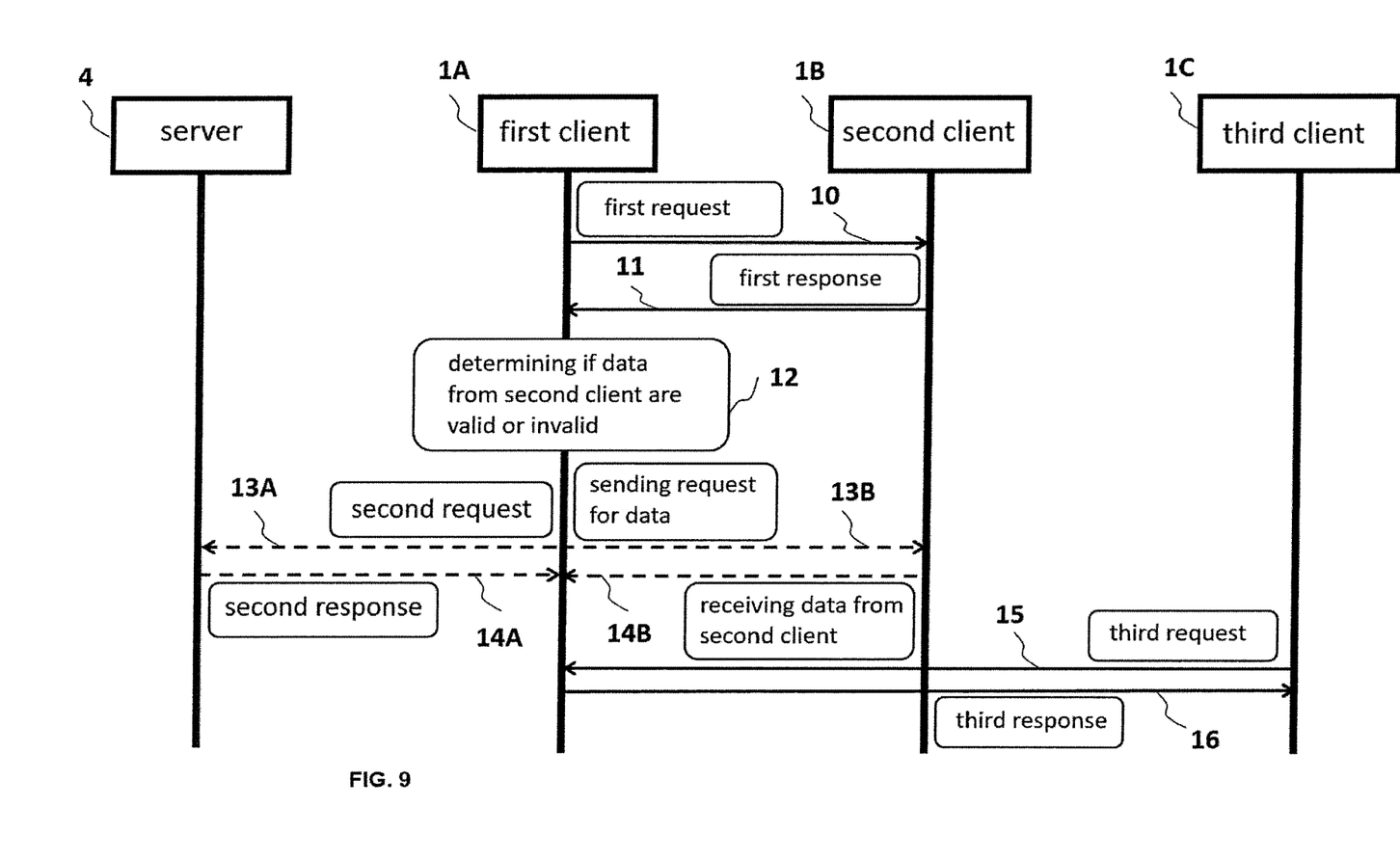
FIG. 9 is a message sequence diagram according to a further embodiment.

FIG. 9 presents a scenario in which the first client 1A has already retrieved and stored the data as well as the validity indication associated beforehand, either from the server 4 in accordance with FIG. 2, or from the second client 1B in accordance with FIG. 8, or from both, as mentioned with reference to FIG. 7. The first client 1A is thus in the position to provide the retrieved data to still other clients 1. The first client 1A receives a third request 15 for the data from a third client 10, whereby the third client 1C requests e.g. view "tableAB" or view "tableAB_UPDATED". The first client 1A sends a third response 16 to the third client 10 in response to the third request 15, wherein the third response 16 comprises the validity indication associated with the requested data. The validity indication included in third response 16 includes, in some embodiments, the same information as the validity indications included in first response 11 from second client 1B or in the second response 13A from server 4, as described above. The third client 1C is then able to determine whether to retrieve the data from the first client 1A and/or from the server 4.

In some embodiment, the first client 1A, in response to receiving the third request 15 from the third client 1C, evaluates the probability that the requested data is invalid (at the current point of time or at an estimated time of receipt of the data at the third client 1C) based on the stored validity indication associated with the data. In continuation of the specific example introduced above, the first client 1A evaluates the probability that e.g. view "tableAB" or e.g. view "tableAB_UPDATED" requested by third client 1C is invalid. If the determination yielded that the requested data is likely valid, in response to that result, first client 1A may directly include the data requested into the third response 16 (e.g. view "tableAB" or view "tableAB_UPDATED") to the third client 1C. If, however, the first client 1A determines that the data requested by the third client 1C is likely invalid (at the current point of time or at an estimated time of receipt of the data at the third client 1C), the first client 1A includes, in some embodiments, the validity indication in the third response 16, but not the requested data itself.

As already mentioned above, in some embodiments, the validity indication comprises a timestamp to indicating a time when the requested data (e.g. view "tableAB" or e.g. view "tableAB_UPDATED") was generated, and also a validity rate C of the requested data. The validity rate C may approximate the probability of invalidity over time, e.g. on the basis of a probabilistic model. The validity rate C of the requested data (e.g. view "tableAB" or view "tableAB_UPDATED") is a measure of how long the requested data remains valid or how fast the requested data becomes invalid due to changes of the underlying original data. This validity rate of a given requested data is, for example, statistically derived from the occurrence and the outcomes of past (re-)computations or (re-)collections and comparisons of the requested data with its previous state or values. For example, it has been determined that particular requested data has a validity rate C of 10% per hour meaning that the probability of the requested data (e.g. view "tableAB" or view "tableAB_UPDATED") being valid decreases by 10% every hour. At the time of its (re-)collection or (re-)computation, view "tableAB" or view "tableAB_UPDATED" are generally 100% valid. After one hour, view "tableAB" or view "tableAB_UPDATED" are valid with a probability of 90%. After two hours the validity of view "tableAB" or view "tableAB_UPDATED" is 81% (=90% decreased by another 10%). After three hours, view "tableAB" or view "tableAB_UPDATED" probable validities is at 72.9%, and so on.

Figure 10:
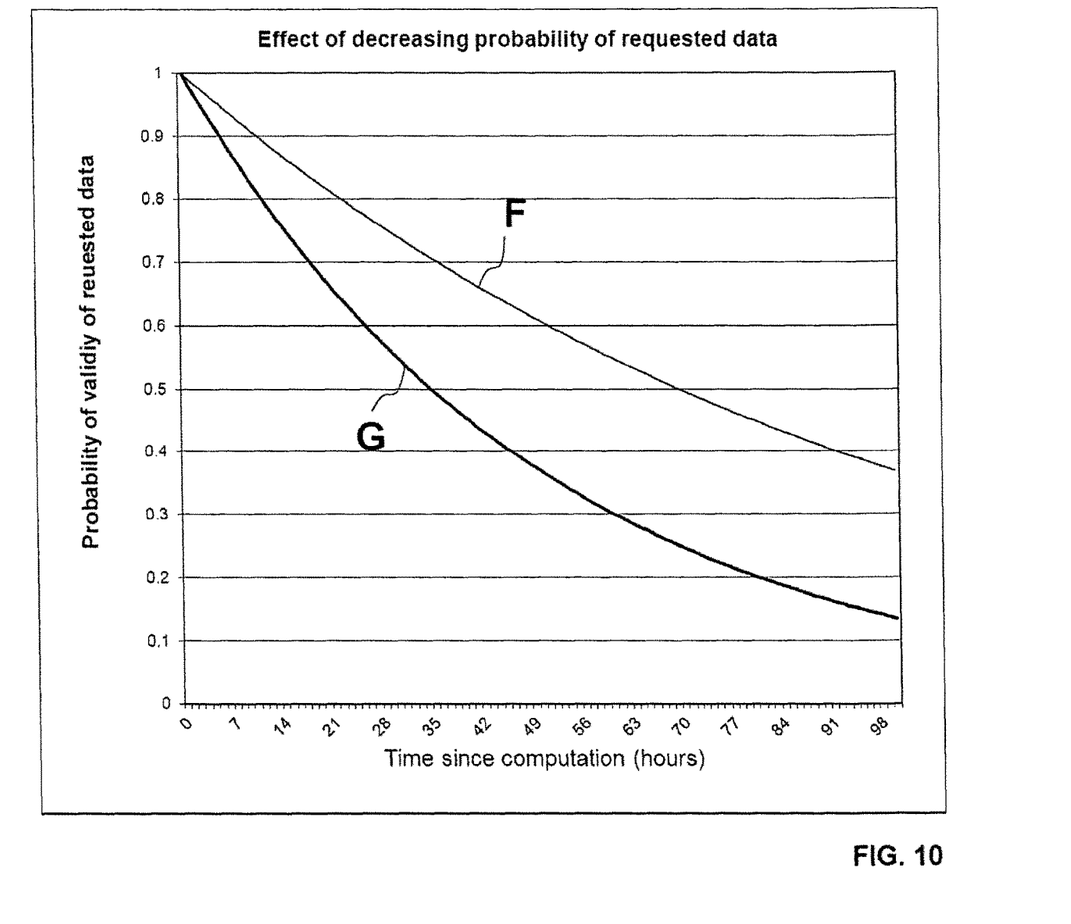
FIG. 10 shows exemplary functions of the probable accuracy decreasing over time according to some embodiments.

In some embodiments, a validity probability value given by equation 1 (as introduced above) is calculated by first client 1A, wherein t denotes a current time or the estimated time of receipt of the data. The validity rate C may be employed to provide an estimate of the probability for requested data to stay valid after a given time. This is also referred as the probability of requested data (e.g. view "tableAB" or view "tableAB_UPDATED") being valid or, in other words, not being outdated. Two exemplary functions of this probable validity decreasing over time are depicted by FIG. 10. Function F represents requested data which potentially remains more accurate (or, more correctly, stays at a higher probability of being valid over time) than another requested data associated with function G. For example, the requested data represented by function F has 70% probability of being still valid at 35 hours after its last generation, while the other requested data characterized by function G is only valid up to about 50% at 35 hours after its latest generation. The first client 1A compares the validity probability value for e.g. view "tableAB" or view "tableAB_UPDATED" with a given threshold value and determines 12 that the requested data is likely invalid if the validity probability value is below the given threshold value.

FIG. 11 is a diagrammatic representation of the internal component of a computing machine of the server 4 and/or the clients 1A, 1B, 1C. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A video display, an alphanumeric input device and a cursor control device may be provided as examples of user interface 102. The network interface device 103 connects the computing machine 100 to the other components of the distributed computing system such as the clients 1A, 1B, 1C, the server 4 or further components such as databases.

Computing machine 100 also hosts the cache 107. The 107 may store the received database tables also in a cache. The cache 107 within the present embodiments may be composed of hardware and software components that store the database tables so that future requests for the database tables can be served faster than without caching. There can be hardware-based caches such as CPU caches, GPU caches, digital signal processors and translation lookaside buffers, as well as software-based caches such as page caches, web caches (Hypertext Transfer Protocol, HTTP, caches) etc. Both, the server 4 and the clients 1A, 1B, 1C may comprise of a cache 107. Server 4 starts data processing such as decoding the received database tables, elimination of errors residing in the database tables by removing e, g, redundant data sets from the database tables or data sets with missing entries. Furthermore, the database tables are brought into a common data format to ease further processing.

A set of computer-executable instructions (i.e., computer program code) embodying any one, or all, of the methodologies described herein, resides completely, or at least partially, in or on a machine-readable medium, e.g., the main memory 106. Main memory 106 hosts computer program code for functional entities such as database request processing 108 which includes the functionality to receive and process database requests and data processing functionality 109. The instructions may further be transmitted or received as a propagated signal via the Internet through the network interface device 103 or via the user interface 103. Communication within computing machine is performed via bus 104. Basic operation of the computing machine 100 is controlled by an operating system which is also located in the main memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

The invention claimed is:

1. A method for handling data in a distributed computing environment comprising a server and a plurality of clients, the plurality of clients comprising a first client and a second client, and the method comprising, at the first client:
    sending a first request for data to the second client;
    receiving a first response from the second client in response to the first request;
    determining a probability of validity of the data requested by the first request and available from the second client based on a validity indication included in the first response, wherein the validity indication indicates a probability that the data requested from the second client is invalid, and wherein determining the probability of validity of the data requested by the first request and available from the second client based on the validity indication included in the first response comprises:
        estimating a time of receipt of the data from the second client based on a size of the data in the first response and a given bandwidth of a connection to the second client, and
        determining the probability of validity of the data at the time of receipt; and
    in response to determining that the data requested by the first request and available from the second client is likely invalid,
        sending a second request to the server to obtain the data from the server;
        receiving the data from the server in a second response to the second request, wherein the second response includes a validity indication indicating a probability that the data requested from the server is invalid; and storing the data received from the server associated with the validity indication included in the second response.

2. The method of claim 1, further comprising:

in response to determining that the data requested by the first request and available from the second client is likely valid, retrieving the data from the second client if the data was not already included in the first response; and storing the retrieved data associated with the validity indication included in the first response.

3. The method of claim 2, wherein the plurality of clients comprise a third client, and further comprising, at the first client:

receiving a third request for the data from the third client; and sending a third response to the third client in response to the third request, wherein the third response comprises the validity indication associated with the data.

4. The method of claim 3, further comprising, at the first client:

in response to receiving the third request, evaluating the probability that the requested data is invalid based on the stored validity indication associated with the data; and in response to determining that the requested data is likely still valid, including in the third response the data requested by the third client.

5. The method of claim 4, wherein the validity indication comprises a timestamp t0 indicating a time when the requested data was generated.

6. The method of claim 5, wherein the validity indication further comprises a validity rate C of the requested data modeled by a probabilistic model.

7. The method of claim 6, wherein determining that the requested data is potentially invalid comprises:

calculating a validity probability value given by $e\char`\^(-C(t-t\_0))$, wherein t denotes a current time or the time of receipt of the data;

comparing the validity probability value with a given threshold value; and determining that the requested data is likely invalid if the validity probability value is below the given threshold value.

8. A computing machine acting as a first client for handling data in a distributed computing environment comprising a server and a plurality of clients, the plurality of clients comprising the first client and a second client, and the computing machine including at least one processor and a memory containing instructions that, when executed by the at least one processor, cause the computing machine to perform operations comprising:

send a first request for data to the second client;

receive a first response from the second client in response to the first request; determine a probability of validity of the data requested by the first request and available from the second client based on a validity indication included in the first response, wherein the validity indication indicates a probability that the data requested from the second client is invalid, and wherein determine the probability of validity of the data requested by the first request and available from the second client based on the validity indication included in the first response comprises:

estimate a time of receipt of the data from the second client based on a size of the data in the first response and a given bandwidth of a connection to the second client, and determine the probability of validity of the data at the time of receipt; and in response to determining that the data requested by the first request and available from the second client is likely invalid, send a second request to the server to obtain the data from the server; and receive the data from the server in a second response to the second request, wherein the second response includes a validity indication indicating a probability that the data requested from the server is invalid; and store the data received from the server associated with the validity indication included in the second response.

9. The computing machine of claim 8, wherein the operations further comprise:

in response to determining that the data requested by the first request and available from the second client is likely valid, retrieve the data from the second client if the data was not already included in the first response; and store the retrieved data associated with the validity indication included in the first response.

10. The computing machine of claim 9, wherein the plurality of clients comprise a third client, and the operations further comprise, at the first client:

receiving a third request for the data from a third client; and sending a third response to the third client in response to the third request, wherein the third response comprises the validity indication associated with the data.

11. The computing machine of claim 10, wherein the operations further comprise, at the first client:

in response to receiving the third request, evaluating the probability that the requested data is invalid based on the stored validity indication associated with the data; and in response to determining that the requested data is likely still valid, including in the third response the data requested by the third client.

12. The computing machine of claim 11, wherein the validity indication comprises a timestamp t0 indicating a time when the requested data was generated.

13. The computing machine of claim 12, wherein the validity indication further comprises a validity rate C of the requested data modeled by a probabilistic model.

14. The computing machine of claim 13, wherein determining that the requested data is potentially invalid comprises:

calculating a validity probability value given by $e\char`\^(-C(t-t\_0))$, wherein t denotes a current time or the time of receipt of the data;

comparing the validity probability value with a given threshold value; and determining that the requested data is likely invalid if the validity probability value is below the given threshold value.

15. A computer program product comprising:

a non-transitory computer-readable storage medium comprising program code instructions that upon execution by at least one processor of a computer cause the computer to act as a first client for handling data in a distributed computing environment comprising a server and a plurality of clients, the plurality of clients comprising the first client and a second client, and wherein the instructions comprise:

send a first request for data to the second client;

receive a first response from the second client in response to the first request; determine a probability of validity of the data requested by the first request and available from the second client based on a validity indication included in the first response, wherein the validity indication indicates a probability that the data requested from the second client is invalid, and wherein determine the probability of validity of the data requested by the first request and available from the second client based on the validity indication included in the first response comprises:

estimate a time of receipt of the data from the second client based on a size of the data in the first response and a given bandwidth of a connection to the second client, and    determine the probability of validity of the data at the time of receipt; and in response to determining that the data requested by the first request and available from the second client is likely invalid,    send a second request to the server to obtain the data from the server; and    receive the data from the server in a second response to the second request, wherein the second response includes a validity indication indicating a probability that the data requested from the server is invalid; and store the data received from the server associated with the validity indication included in the second response.

\* \* \* \* \*